(No Model.)
D. T. ENSIGN.
VEHICLE SPRING.
No. 497,372. Patented May 16, 1893.
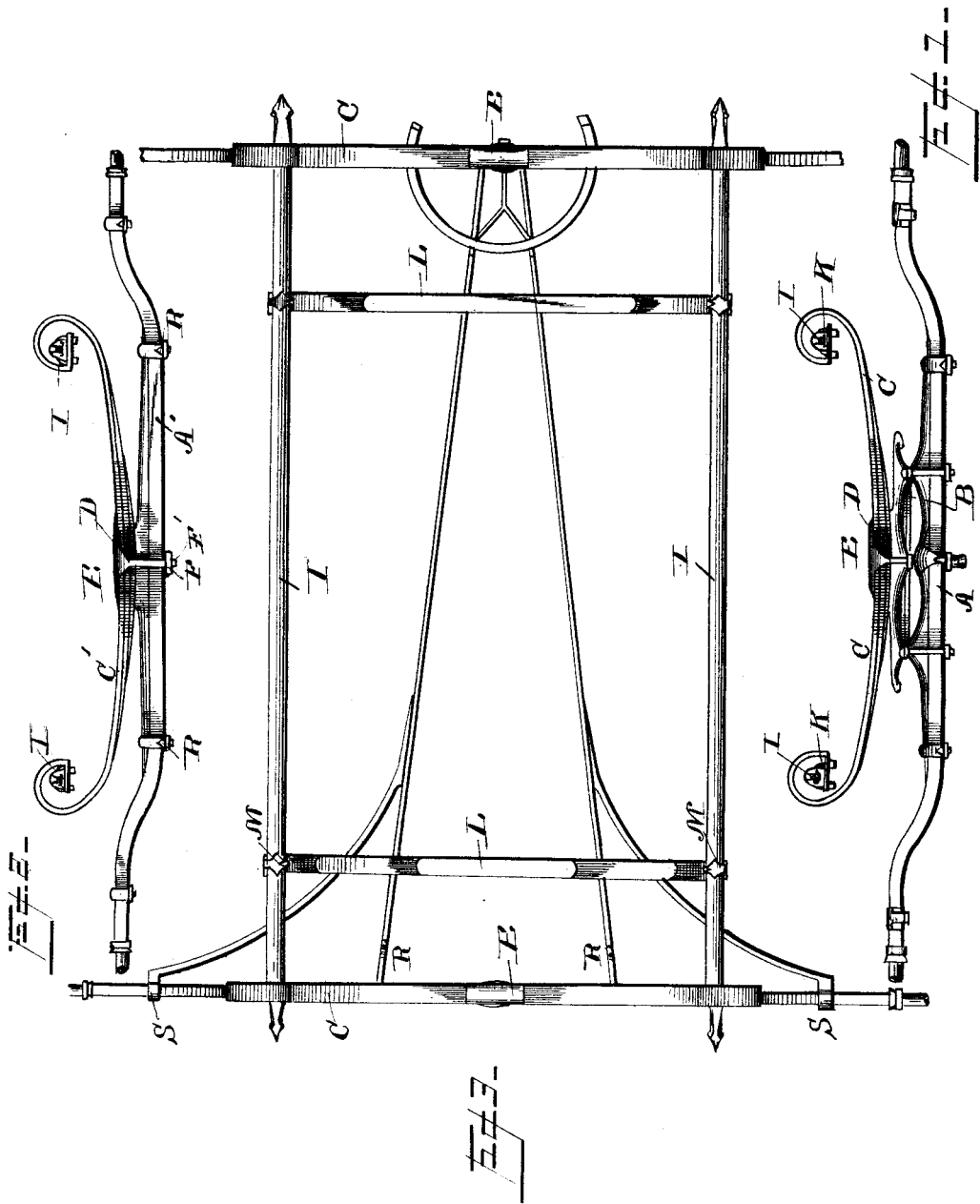
Witnesses:
Inventor
David T. Ensign
By J. R. Nottingham
Atty.

UNITED STATES PATENT OFFICE.

DAVID T. ENSIGN, OF CORTLAND, NEW YORK.

VEHICLE-SPRING.

SPECIFICATION forming part of Letters Patent No. 497,372, dated May 16, 1893.

Application filed January 26, 1893. Serial No. 459,855. (No model.)

*To all whom it may concern:*

Be it known that I, DAVID T. ENSIGN, a citizen of the United States, residing at Cortland, in the county of Cortland and State of New York, have invented certain new and useful Improvements in Running-Gear for Vehicles; and I do hereby declare the following to be a full, clear, and exact description of the invention, such as will enable others skilled in the art to which it appertains to make and use the same.

This invention relates to certain improvements in the running gear of vehicles, and it has for its objects to provide an improved spring for such gear and to provide improved means for connecting the springs to the axles and the body of the vehicle to the springs as more fully hereinafter set forth.

The above mentioned objects are attained by the means illustrated in the accompanying drawings, in which—

Figure 1 represents a view in side elevation, of the front axle of a vehicle showing my invention. Fig. 2, represents a similar view of the rear axle and spring, and Fig. 3 a plan view of the running gear complete.

Referring to the drawings:—the letter A indicates the front axle; A' the rear axle and B the head block, which is located midway between the ends of the front axle as usual.

C and C' indicate the springs which are secured to the head-block and axle-bed respectively, by means of the clips D. These clips are similar to the ordinary clips with the exception that they are provided with broad or laterally extended heads E, so as to take a firmer grip upon the springs, and hold them more securely to their seats. The ends of the clips are screw threaded and provided with the usual cross-plates F and securing nuts F'.

The letter H indicates the springs of the vehicle. These are of the style known as leaf springs and each may be formed of a single strip or of a multiplicity of united strips, as may be desired. The ends of the springs are bent upwardly and curving inwardly and downwardly are then bent horizontally, as shown in the respective figures of the drawings, the horizontal bends forming seats for the side bars I of the vehicle, which are secured thereto by clips K, or in any other convenient manner.

Referring to Fig. 3 of the drawings, the side bars I are shown connected by cross springs L which are fastened to the said side bars by clips M. The front and rear axles are connected by hounds N which extend from the head block of the front axle rearwardly, where they are branched and connected to the rear axle at the points R and S.

By the spring, constructed as described, and the means of connecting the same to the axles and the side bars of the vehicle, a running gear is obtained which will give the proper vertical spring movement to the body of the vehicle without undue lateral play, thus insuring comfort to the occupants of the vehicle, and rendering the vehicle more desirable.

Having thus described my invention, what I claim, and desire to secure by Letters Patent, is—

1. A vehicle spring having its ends bent upwardly and curving inwardly and downwardly are then bent horizontally to form a seat for the side-bars of a vehicle, substantially as specified.

2. The combination, with the axles of a vehicle, of the springs having their ends bent upwardly, inwardly, downwardly and then horizontally, the side-bars supported by and rigidly clipped to the horizontal portions, and the clips having extended heads and fastening devices, whereby the springs are secured to the axles, substantially as specified.

3. In a running-gear for vehicles, the combination, with the axles and the branched hounds connecting the same together, of the springs having their ends, bent upwardly, inwardly, downwardly and then horizontally to form seats for the side-bars, the clips having extended heads and fastening devices for receiving the springs to the axles, and the side-bars rigidly clipped to the horizontal portion of said springs, substantially as specified.

In testimony whereof I affix my signature in the presence of two witnesses.

DAVID T. ENSIGN.

Witnesses:
JOHN W. SUGGETT,
GEO. J. MAYCUMBER.